(12) United States Patent
Athipatla et al.

(10) Patent No.: US 10,662,948 B2
(45) Date of Patent: May 26, 2020

(54) EXPANSION CHAMBER FOR A BRAKE BOOST VACUUM PUMP

(71) Applicant: HELLA GmbH & Co. KGaA, Lippstadt (DE)

(72) Inventors: Harish Chowdhary Athipatla, Livonia, MI (US); Archie Villareal Gonzalez, Livonia, MI (US)

(73) Assignee: HELLA GmbH & Co. KGaA, Lippstadt (DE)

(*) Notice: Subject to any disclaimer, the term of this patent is extended or adjusted under 35 U.S.C. 154(b) by 78 days.

(21) Appl. No.: 15/981,386

(22) Filed: May 16, 2018

(65) Prior Publication Data

US 2018/0355870 A1 Dec. 13, 2018

Related U.S. Application Data

(60) Provisional application No. 62/518,678, filed on Jun. 13, 2017.

(51) Int. Cl.
| | |
|---|---|
| *F04C 29/06* | (2006.01) |
| *B60T 13/52* | (2006.01) |
| *B60T 17/06* | (2006.01) |
| *B60T 13/46* | (2006.01) |
| *F04C 18/344* | (2006.01) |
| *F04C 25/02* | (2006.01) |

(52) U.S. Cl.
CPC ............ *F04C 29/061* (2013.01); *B60T 13/46* (2013.01); *B60T 13/52* (2013.01); *B60T 17/06* (2013.01); *F04C 25/02* (2013.01); *F04C 18/344* (2013.01); *F04C 29/065* (2013.01)

(58) Field of Classification Search
CPC ........ F04C 29/12; F04C 29/06; F04C 29/061; F04C 29/063; F04C 29/065; F04C 29/066; F04C 29/068; F01N 13/00; F01N 13/001; F01N 13/002; F01N 13/007; F01N 13/18; F01N 1/02; F01N 1/023; F01N 1/026; B60T 17/008; B60T 13/52; B60T 13/16
See application file for complete search history.

(56) References Cited

U.S. PATENT DOCUMENTS

| | | | | |
|---|---|---|---|---|
| 4,263,981 | A * | 4/1981 | Weiss | F01N 1/02 181/252 |
| 4,747,761 | A * | 5/1988 | Yumiyama | F04C 29/068 181/272 |
| 5,201,878 | A * | 4/1993 | Abe | F04C 15/0049 418/133 |

(Continued)

*Primary Examiner* — Michael Leslie
*Assistant Examiner* — Dustin T Nguyen
(74) *Attorney, Agent, or Firm* — Warner Norcross + Judd LLP

(57) ABSTRACT

An expansion chamber for a rotary vane vacuum pump is provided. The expansion chamber is in fluid communication with the discharge side of the rotary vane vacuum pump, such that the expansion chamber attenuates sound as a Helmholtz resonator. The expansion chamber includes an internal volume of between 80 cubic centimeters and 100 cubic centimeters, inclusive, and includes a curved sidewall that extends partially around, and generally conforms to, the exterior of the rotary vane vacuum pump. The expansion chamber also includes a downward extending port, open to the atmosphere, for attachment to a hose in applications in which the expansion chamber is below a water line.

20 Claims, 3 Drawing Sheets

(56) References Cited

U.S. PATENT DOCUMENTS

| | | | | |
|---|---|---|---|---|
| 6,292,364 B1* | 9/2001 | Fitzgerald | ........... | H05K 7/20345 |
| | | | | 165/80.4 |
| 8,734,128 B2* | 5/2014 | God | .................... | F04B 39/0055 |
| | | | | 417/312 |
| 2009/0299306 A1* | 12/2009 | Buan | ................... | A61M 1/0031 |
| | | | | 604/319 |
| 2013/0101412 A1* | 4/2013 | Mitsuhashi | ......... | F04C 18/3441 |
| | | | | 415/220 |
| 2014/0035354 A1* | 2/2014 | Wirtz | ...................... | B60T 17/02 |
| | | | | 303/12 |
| 2015/0035271 A1* | 2/2015 | Luce | .................... | F16L 57/005 |
| | | | | 285/114 |
| 2015/0107935 A1* | 4/2015 | Dobrin | ............... | F02M 35/1261 |
| | | | | 181/214 |
| 2017/0106113 A1* | 4/2017 | Meinhart | ................ | A61L 9/037 |

* cited by examiner

EXPANSION CHAMBER FOR A BRAKE BOOST VACUUM PUMP

CROSS-REFERENCE TO RELATED APPLICATION

This application claims the benefit of U.S. Provisional Application 62/518,678, filed Jun. 13, 2017, the disclosure of which is hereby incorporated by reference in its entirety.

FIELD OF THE INVENTION

The present invention relates to an expansion chamber for attenuating noise from operation of a brake boost vacuum pump.

BACKGROUND OF THE INVENTION

Most modern brake systems include a brake booster to multiply the driver's pedal effort as the brake pedal is depressed. When the brake pedal is depressed, low air pressure within a brake booster assists in depressing a master brake cylinder. More specifically, low air pressure within a vacuum chamber relative to a supply chamber causes forward movement of a diaphragm which, in addition to the brake pedal, pushes forward a brake cylinder piston.

Brake boosters require a source of negative pressure for the vacuum chamber. For gasoline engines, engine manifold airflow is typically used to generate negative pressure. However, many compact vehicles have somewhat smaller engines that lack the additional capacity to provide sufficient negative pressure for a brake booster. In these vehicles, it becomes necessary to provide a dedicated vacuum pump for the brake booster vacuum chamber.

Rotary vane pumps are a known category of vacuum pumps for brake boosters. Rotary vane pumps include rotating vane chambers between adjacent vanes. As the vanes rotate, the vane chambers vary in size to draw air from the inlet side of the pump to the discharge side of the pump, creating a source of negative pressure at the inlet side. The vanes are typically rotated by an electric motor within a pump housing.

Despite the advantages of rotary vane pumps, in some instances rotary vane pumps may generate a perceptible noise at specific frequencies. Accordingly, there remains a continued need to reduce the acoustic output of rotary vane pumps for use with brake boosters and potentially other applications.

SUMMARY OF THE INVENTION

An expansion chamber for reducing the noise output of a rotary vane pump for a brake booster is provided. The expansion chamber generally includes an internal expansion volume in fluid communication with the output of the rotary vane pump, such that a flow path is defined through the expansion chamber, to thereby attenuate sounds caused by high frequency pulsations of the rotary vane pump. The expansion chamber is well suited for use in compact vehicles, including battery electric vehicles, however the expansion chamber can be used in other vehicles as desired.

In accordance with one embodiment, an expansion chamber for an electrically-driven rotary vane vacuum pump is provided. The expansion chamber is in fluid communication with an outlet side of the rotary vane pump, such that the expansion chamber attenuates sound as a Helmholtz resonator. The expansion chamber includes an internal volume of between 80 cubic centimeters and 100 cubic centimeters, inclusive, which was found to significantly attenuate the acoustic output of a rotary vane pump. The expansion chamber includes a curved sidewall that extends partially around, and generally conforms to, the exterior of the rotary vane pump. The expansion chamber includes a downward extending port, open to the atmosphere, for attachment to a hose in applications in which the expansion chamber is below a water line.

In accordance with another embodiment, a brake booster system is provided. The brake booster system includes a rotary vane pump driven by operation of an electric motor, a brake booster coupled to an input side of the rotary vane pump, and an expansion chamber coupled to an output side of the rotary vane pump. The expansion chamber includes an inlet port, an outlet port, and a cavity portion therebetween, the cavity portion being curved to extend partially around the rotary vane pump and defining expansion volume being between 80 cubic centimeters and 100 cubic centimeters, inclusive. The expansion chamber further includes a mounting plate for supporting the rotary vane pump thereon, wherein a cross-sectional area of the expansion volume is greater than a cross-sectional area of the inlet port and a cross-sectional area of the outlet port to attenuate sound from operation of the rotary vane pump. The cavity portion is curved about an axis that is orthogonal to the mounting plate, and the mounting plate extends orthogonally from the cavity portion along a lower portion thereof.

These and other features and advantages of the present invention will become apparent from the following description of an embodiment of the invention, when viewed in accordance with the accompanying drawings and appended claim.

DETAILED DESCRIPTION OF THE CURRENT EMBODIMENT

The embodiment disclosed herein includes an expansion chamber coupled to the output of a rotary vane pump for reducing its noise output. As set forth below, the expansion chamber includes an internal expansion volume adapted to function as a Helmholtz resonator. The expansion chamber also includes a mounting plate for the rotary vane pump and includes compact construction that extends partially around the rotary vane pump. Though described herein in connection with compact vehicles, the expansion chamber can be used in other vehicles as desired.

Figure 1:
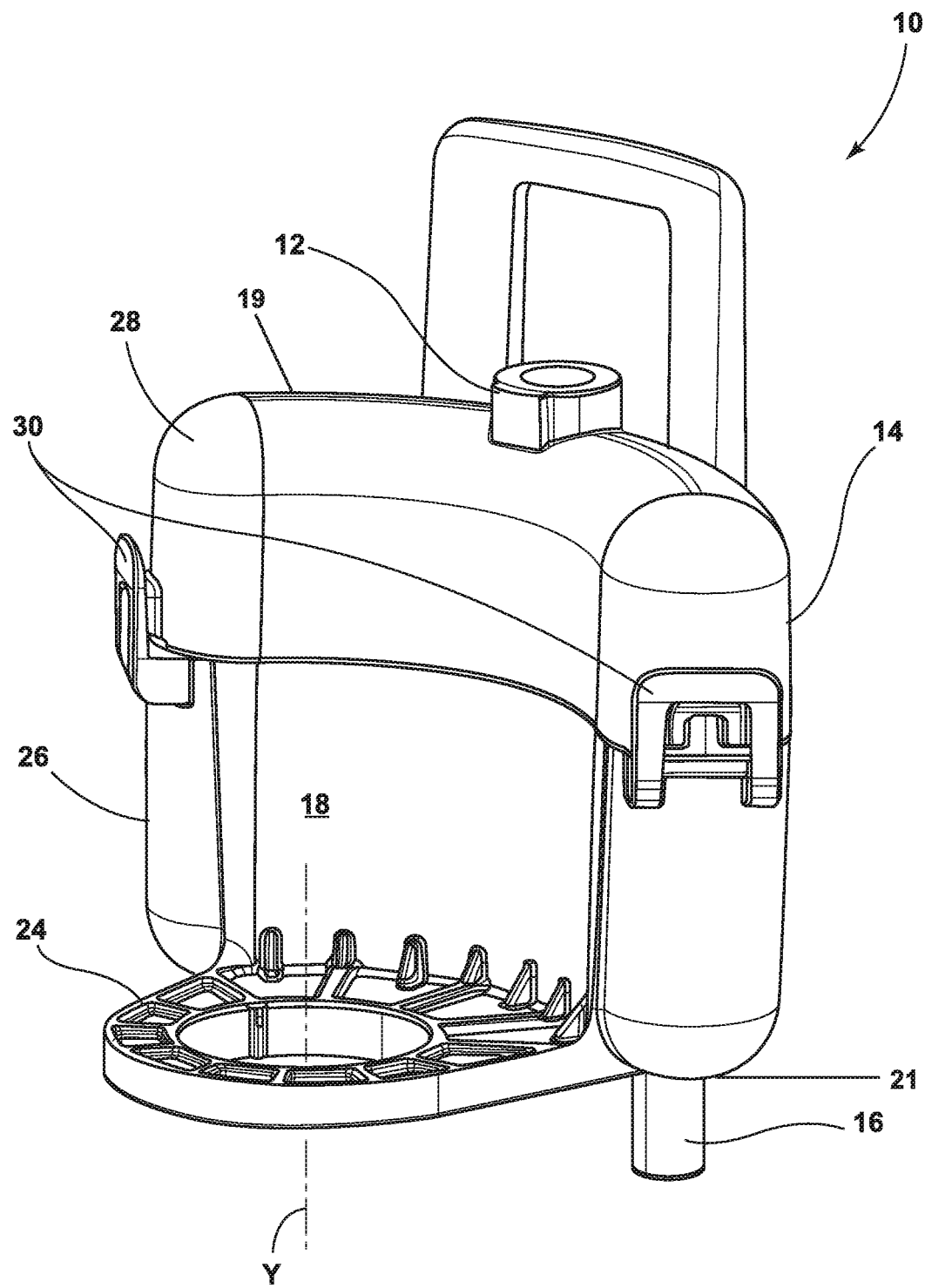
FIG. 1 is a first perspective view of an expansion chamber in accordance with a current embodiment of the present invention.
Figure 2:
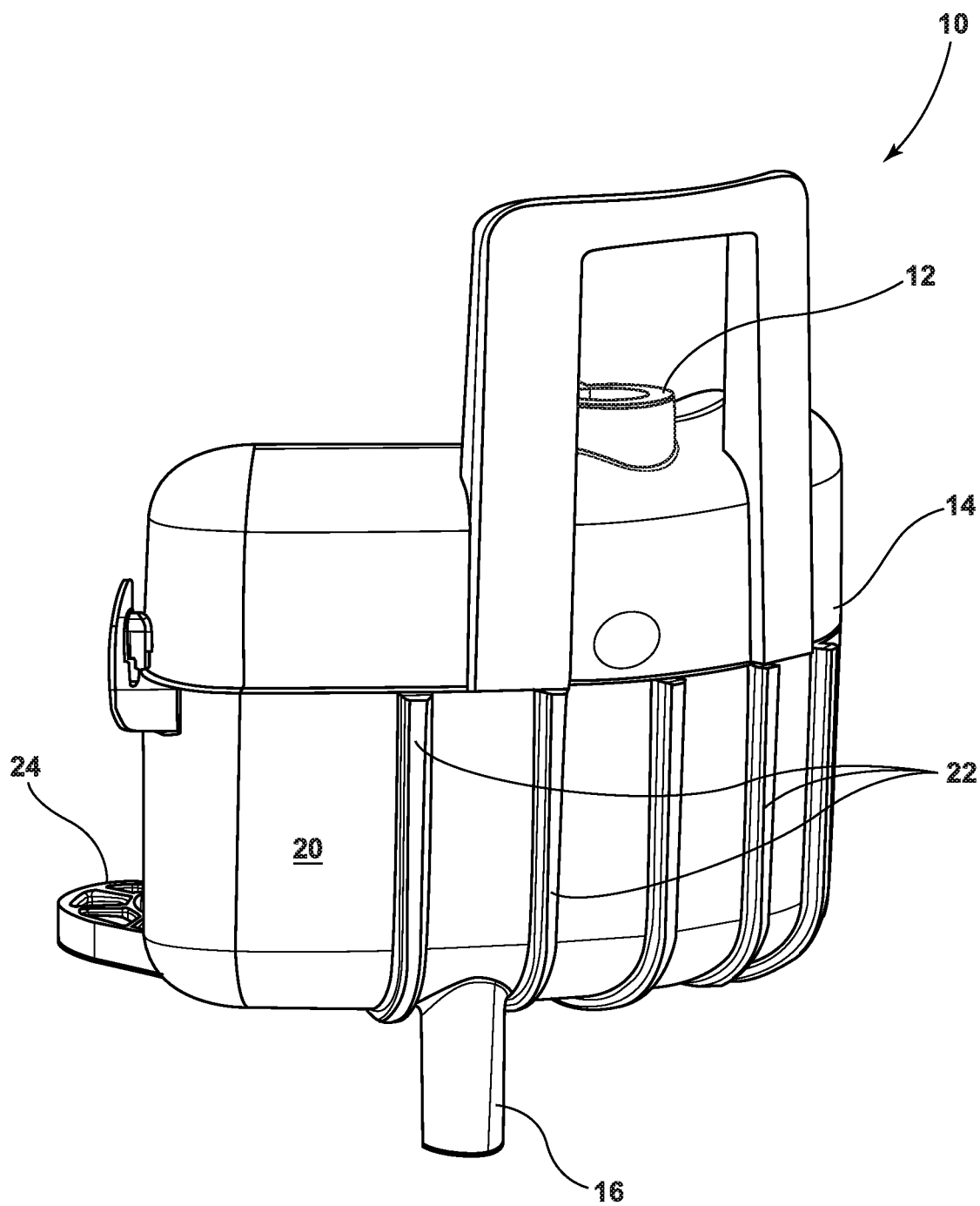
FIG. 2 is a second perspective view of an expansion chamber in accordance with a current embodiment of the present invention.

Referring to FIGS. 1 and 2, an expansion chamber for use with a rotary vane vacuum pump in accordance with one embodiment is illustrated and generally designated 10. The expansion chamber 10 includes an inlet port 12, a cavity portion 14, and an outlet port 16. The inlet port 12 is configured for attachment to the discharge side of a rotary vane vacuum pump. The cavity portion 14 includes a cross-sectional area that is greater than the cross-sectional area of the inlet port 12, such that the cavity portion 14 is an expansion volume. The expansion volume is optionally 70 cc to 110 cc, inclusive, further optionally 80 cc to 100 cc, inclusive. The outlet port 16 is open to the atmosphere and includes a rigid tube for optional attachment to an outlet hose. The outlet port 16 includes a cross-sectional area that is less than the cross-sectional area of the cavity portion 14.

More specifically, the cavity portion 14 is defined by first and second spaced apart curved sidewalls 18, 20, a top surface 19, and a bottom surface 21. The first sidewall 18 includes a concave surface, visible in FIG. 1, and the second sidewall 20 includes a convex surface, visible in FIG. 2. The internal expansion volume is resultantly curved, following an arc of a circle, optionally between 45 degrees and 90 degrees, inclusive. As also shown in FIG. 2, the second sidewall 20 can include a plurality of ribs 22 to improve the structural integrity of the expansion chamber 10. A mounting plate 24 extends orthogonally from the base of the cavity portion 14 for attachment to a rotary vane vacuum pump (not shown). The expansion volume is curved about an axis Y that is orthogonal to a mounting plate 24, the mounting plate 24 being cantilevered from the cavity portion 14 for attachment to a rotary vane pump.

In the illustrated embodiment, the expansion chamber 10 includes a two-piece molded construction. The two-piece construction includes a casing body comprising a lower portion 26 joined to an upper portion 28 along an air-tight interface. First and second snap clips 30 secure the lower portion 26 to the upper portion 28 at opposing sides of the cavity portion 14. The mounting plate 24 is integrally joined to the cavity portion 14 in the current embodiment, being co-molded with the lower portion 16. The inlet port 12 is integrally joined to, and protrudes from, the upper portion 28 of the casing body, and the outlet port 16 is integrally joined to, and protrudes from, the lower portion 26 of the casing body. The outlet portion 16 is axially offset from the inlet port 12, such that the outlet port 16 is not vertically aligned with the inlet port 12. In addition, the outlet port 16 is sized for attachment to an outlet hose, particularly in embodiments in which the expansion chamber 10 may be below a water line.

Figure 3:
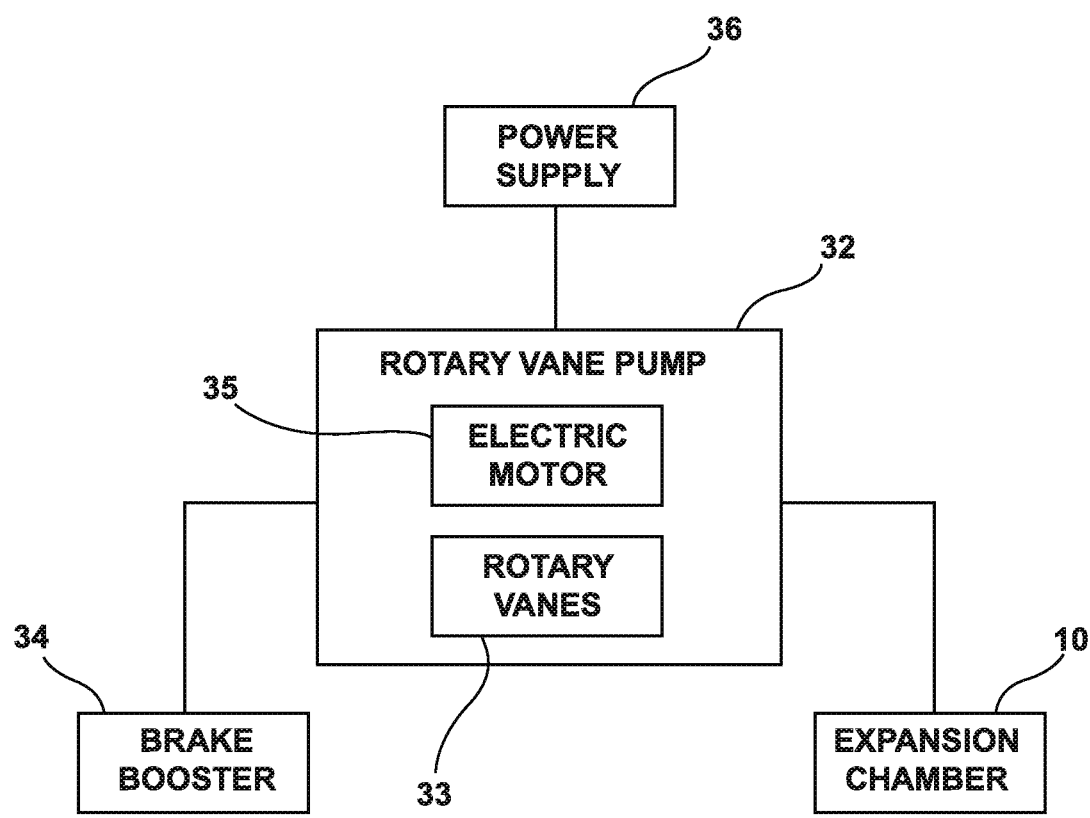
FIG. 3 is a block diagram of a vacuum pump system including the expansion chamber of FIGS. 1 and 2.

As noted above, the expansion chamber 10 provides a flow channel for the discharge of compressed air from the discharge side of a rotary vane pump. Referring now to FIG. 3, the inlet side of a rotary vane pump 32 is in fluid communication with a brake booster 34, such that the rotary vane pump 32 is connected between the brake booster 34 and the expansion chamber 10. The rotary vane pump 32 includes rotary vanes 33 and an electrical motor 35 which receives power from a suitable power supply 36. In the current embodiment, the electrical motor 35 is a DC motor coupled to a DC power supply. During operation, the electrical motor causes the rotary vane pump 32 to rotate at high speeds, thereby providing a source of negative pressure for the brake booster 34 and a source of positive pressure for the expansion chamber 10.

EXAMPLE

Expansion chambers were developed and tested in accordance with the following example of the present invention, which is intended to be non-limiting.

During operation of a rotary vane pump, pulsations of the internal vanes in combination with the internal motor created a perceptible noise. The noise was detected within the range of 550 Hz to 650 Hz. At a nominal 13V DC voltage, the internal motor operated at 4800 rpm. For a rotary vane pump having eight vanes, each motor revolution was accompanied by eight vane pulsations. The vane pulsations per minute were determined by multiplying the number of vanes (8) by the motor speed (4800 rpm), corresponding to 640 vane pulsations per second or 640 Hz. Using the Helmholtz principle of noise reduction by expanding air in a volume, an internal volume of between 80 cc and 100 cc (inclusive) was found to achieve the desired noise reduction. In particular, favorable noise reductions were achieved with internal volumes of about 92 cc and about 100 cc.

The above description is that of current embodiment of the invention. Various alterations and changes can be made without departing from the spirit and broader aspects of the invention. This disclosure is presented for illustrative purposes and should not be interpreted as an exhaustive description of all embodiments of the invention or to limit the scope of any claims to the specific elements illustrated or described in connection with this embodiment. Any reference to elements in the singular, for example, using the articles "a," "an," "the," or "said," is not to be construed as limiting the element to the singular.

The invention claimed is:

1. A vacuum pump system for a brake booster comprising:
a rotary vane pump including an electric motor; and
an expansion chamber external to and separate from the rotary vane pump, the expansion chamber being in fluid communication with a discharge side of the rotary vane pump, the expansion chamber including an inlet port, an outlet port, and a cavity portion therebetween, the cavity portion including a cross-sectional area that is greater than a cross-sectional area of the inlet port and a cross-sectional area of the outlet port, such that the cavity portion is an expansion volume, wherein the expansion volume is between 80 cubic centimeters and 100 cubic centimeters, inclusive, to attenuate sound from high frequency pulsations of the rotary vane pump, the cavity portion including an upper surface, a lower surface, a first curved sidewall defining a concave exterior surface, and a second curved sidewall opposite of the first curved sidewall and defining a convex exterior surface, wherein the inlet port extends upwardly from the upper surface of the cavity portion and wherein the outlet port extends downwardly from the lower surface of the cavity portion.

2. The vacuum pump system of claim 1 further including a mounting plate that extends orthogonally from the cavity portion for attachment to the rotary vane pump.

3. The vacuum pump system of claim 2 wherein the mounting plate is integrally joined to the curved sidewall of the cavity portion.

4. The vacuum pump system of claim 1 wherein the rotary vane pump is connected between the brake booster and the expansion chamber.

5. The vacuum pump system of claim 1 wherein the cavity portion includes a casing body comprising a lower portion and an upper portion that are joined to each other along an interface.

6. The vacuum pump system of claim 5 wherein the inlet port is integrally joined to, and protrudes from, the upper portion of the casing body.

7. The vacuum pump system of claim 5 wherein the outlet port is integrally joined to, and protrudes from, the lower portion of the casing body.

8. The vacuum pump system of claim 5 further including first and second snap clips for securing the upper portion of the casing body to the lower portion of the casing body.

9. The vacuum pump system of claim 1 wherein the outlet port is axially offset from the inlet port, such that the outlet port is not vertically aligned with the inlet port.

10. The vacuum pump system of claim 1 wherein the cross-sectional area of the cavity portion defines an arc of a circle of between 45 degrees and 90 degrees, inclusive.

11. An expansion chamber for attachment to an output of a rotary vane pump, the expansion chamber comprising:
 a casing body including an upper surface, a lower surface, a first curved sidewall defining a concave exterior surface, and a second curved sidewall opposite of the first curved sidewall and defining a convex exterior surface,
 the casing body defining an expansion volume therein, the expansion volume being between 80 cubic centimeters and 100 cubic centimeters, inclusive, and being curved, the casing body including a lower portion and an upper portion that are joined to each other along an air-tight interface, the casing body further including a mounting plate for supporting the rotary vane pump thereon; and
 each of an inlet port and an outlet port joined to the casing body, wherein the inlet port is integrally joined to, and extends upwardly from, the upper surface of the casing body, and wherein the outlet port is integrally joined to, and extends downwardly from, the lower surface of the casing body, such that the expansion chamber defines a flow path through the inlet port, the expansion volume, and the outlet port to attenuate sound caused by operation of the rotary vane pump,
 wherein the expansion chamber is external to and separate from the rotary vane pump.

12. The expansion chamber of claim 11 wherein the casing body is curved about an axis that is orthogonal to the mounting plate.

13. The expansion chamber of claim 11 wherein the mounting plate extends orthogonally from the casing body along the lower portion thereof.

14. The expansion chamber of claim 11 further including first and second snap clips for securing the upper portion of the casing body to the lower portion of the casing body.

15. The expansion chamber of claim 11 wherein the outlet port is axially offset from the inlet port, such that the outlet port is not vertically aligned with the inlet port.

16. A brake booster system comprising:
 a rotary vane pump driven by operation of an electric motor;
 a brake booster coupled to an input side of the rotary vane pump; and
 an expansion chamber external to and separate from the rotary vane pump, the expansion chamber coupled to an output side of the rotary vane pump, the expansion chamber including an inlet port, an outlet port, and a cavity portion therebetween, the cavity portion including an upper surface, a lower surface, a first curved sidewall defining a concave exterior surface, and a second curved sidewall defining a convex exterior surface and being opposite of the first curved sidewall, the cavity portion defining an expansion volume being between 80 cubic centimeters and 100 cubic centimeters, inclusive, the expansion chamber further including a mounting plate for supporting the rotary vane pump thereon, wherein a cross-sectional area of the expansion volume is greater than a cross-sectional area of the inlet port and a cross-sectional area of the outlet port to attenuate sound from operation of the rotary vane pump,
 wherein the inlet port extends upwardly from the upper surface of the cavity portion and wherein the outlet port extends downwardly from the lower surface of the cavity portion.

17. The brake booster system of claim 16 wherein the cavity portion is curved about an axis that is orthogonal to the mounting plate.

18. The brake booster system of claim 16 wherein the mounting plate extends orthogonally from the cavity portion along a lower portion thereof.

19. The brake booster system of claim 16 wherein the cavity portion comprises a lower portion and an upper portion that are joined to each other along an air-tight interface.

20. The brake booster system of claim 16 wherein the outlet port is axially offset from the inlet port, such that the outlet port is not vertically aligned with the inlet port.

* * * * *